United States Patent [19]
Snow et al.

[11] Patent Number: 5,949,979
[45] Date of Patent: Sep. 7, 1999

[54] METHOD AND APPARATUS FOR DYNAMIC ADDITION OF BUSES TO A COMPUTER SYSTEM

[75] Inventors: Kevin D. Snow, Alta, Calif.; J. Rhoads Hollowell, II, Lafayette, Colo.; Derek J. Foster, Sunnyvale, Calif.

[73] Assignee: Apple Computer, Inc., Cupertino, Calif.

[21] Appl. No.: 08/798,701

[22] Filed: Feb. 12, 1997

[51] Int. Cl.[6] .................................................. G06F 13/00
[52] U.S. Cl. ........................................ 395/283; 395/828
[58] Field of Search .................................. 395/283, 284, 395/828, 830, 831, 832, 835, 837, 838, 839, 652, 653

[56] References Cited

U.S. PATENT DOCUMENTS

| | | | |
|---|---|---|---|
| 5,210,855 | 5/1993 | Bartol | 395/287 |
| 5,317,697 | 5/1994 | Husak et al. | 395/325 |
| 5,323,291 | 6/1994 | Boyle et al. | 361/683 |
| 5,386,567 | 1/1995 | Lien et al. | 395/700 |
| 5,444,644 | 8/1995 | Divjak | 364/550 |
| 5,463,261 | 10/1995 | Skarda et al. | 307/131 |
| 5,473,499 | 12/1995 | Weir | 361/58 |
| 5,515,515 | 5/1996 | Kennedy et al. | 395/283 |
| 5,526,493 | 6/1996 | Shu | 395/281 |
| 5,548,782 | 8/1996 | Michael et al. | 395/835 |
| 5,564,024 | 10/1996 | Pemberton | 395/283 |
| 5,594,873 | 1/1997 | Garrett | 395/281 |
| 5,594,874 | 1/1997 | Narayanan et al. | 395/284 |
| 5,608,877 | 3/1997 | Sung et al. | 395/284 |
| 5,664,119 | 9/1997 | Jeffries et al. | 395/283 |
| 5,721,838 | 2/1998 | Takahashi et al. | 395/283 |

OTHER PUBLICATIONS

Wilson, Ron; "PicoPower eyes hot–docking," Electronic Engineering Times No. 858, p. 14, Jul. 24, 1995.
Morgenstern, David; "Power catches PCI wave with new line of clones," MacWeek, vol. 9, No. 36, Sep. 11, 1995.

Primary Examiner—Glenn A. Auve
Attorney, Agent, or Firm—Beyer & Weaver, LLP

[57] ABSTRACT

A technique for dynamic addition or removal of buses to a computer system. The technique operates even though the computer system and its operating system are in use. As buses are added or removed from the operational computer system for each peripheral device added or removed, bus controller manipulators for each of the buses are registered with a system bus manager of the operating system. Thereafter, the operating system is able to communicate with the peripheral devices over the corresponding buses using the respective bus controller manipulators.

22 Claims, 7 Drawing Sheets

METHOD AND APPARATUS FOR DYNAMIC ADDITION OF BUSES TO A COMPUTER SYSTEM

CROSS-REFERENCE TO RELATED APPLICATION

This application is related to U.S. patent application Ser. No. 08/519,505, filed Aug. 25, 1995 which is hereby is incorporated by reference for all purposes.

BACKGROUND OF THE INVENTION

1. Field of the invention

The present invention relates to computer systems, and more particularly, to peripheral bus management in computer systems.

2. Description of the Related Art

Peripheral devices typically need to connect to ports of a computer. For example, it is currently very popular to connect PC-CARD devices to computers. These connections require that the receiving computer have a port with a connector that is compatible with the connector used on the PC-CARD device. Other examples of peripheral devices frequently connected to computers include disk drives and network devices. These connections involve the connection of a connector on the peripheral device with a related connector on the computer. Previously, to safely make such connections (i.e., "dock" the peripheral device to the computer) the computer should be powered off prior to the connection. However, requiring powering down whenever connecting peripheral devices is disadvantageous and unsatisfactory to most users. The requirement of powering down a computer system before connecting a peripheral device is unsatisfactory to most users because they want the flexibility to connect and disconnect peripheral devices from the computer system at will even when the computer is in use. Many users find the power down requirement so burdensome that they perform unsafe connections at great risk to their computer and peripheral devices. Currently, PC-CARD device are known to be "hot-plugable" or "hot-swappable", but many other existing peripheral devices are not and therefore the computer should be powered down.

The notion of "hot-plugging" represents the concept of safely connecting a peripheral device to a computer required the powering down of the computer (and possibly the peripheral device) before such connection is made. With hot-plugging, the computer system should be able to dynamically recognize the presence and absence of the peripheral device. In certain computer systems that permit hot-plugging, the available buses of the computer systems were pre-allocated. Hence, when a peripheral device having an external bus was plugged into a slot of a computer system, even without restarting, the bus for the peripheral device was made available to the computer system. However, the mechanism (namely, the operating system) used to setup the bus within the computer system did so by pre-allocation of the bus and the necessary resources for the bus. The pre-allocation approach conventionally used therefore resulted in fixing the types of buses that could be supported by the computer system. The pre-allocation approach also made inefficient use of system resources because the pre-allocation consumes system resources regardless of whether a peripheral device is physically present to use the allocated resources.

More particularly, the PowerBook 5300 produced by Apple Computer, Inc. included an operating system with an AT Attachment (ATA) manager that was responsible for managing communications with any ATA buses coupled to the computer system. ATA represents a device interface that was used on the IBM-PC/AT computers and subsequently standardized. The conventional design of the ATA manager was linked to a fixed set of specific types of host controllers that were part of the operating system. Each host controller is designed especially for a particular peripheral bus. The problem then is that to add a new host controller or modify one of the host controllers, the ATA manager (which is part of the operating system) had to be revised. This leads to difficulties in maintaining the operating system as the host controllers are constantly changing. It also made it difficult for third-party developers to have their particular host controllers included within the operating system.

Thus, there is a need to provide an improved approach to providing host controllers to a computer system.

SUMMARY OF THE INVENTION

Broadly speaking, the invention pertains to dynamic addition or removal of buses to a computer system while the computer system and its operating system are in use. As buses are added or removed from the operational computer system for each peripheral device added or removed, bus controller manipulators for each of the buses are registered with a system bus manager of the operating system. Thereafter, the operating system is able to communicate with the peripheral devices over the corresponding buses using the respective bus controller manipulators.

The invention can be implemented in numerous ways, including as a method, a computer system, and as a computer readable medium. Several embodiments of the invention are discussed below.

As a method for dynamically managing buses of a computer system having an operating system, an embodiment of the invention includes the operations of: monitoring gain or loss of a peripheral bus to the computer system during operation of the computer system; allocating system resources when the peripheral bus is gained by the computer system; deallocating system resources when the peripheral bus is lost by the computer system; and informing the operating system of the gain or loss of the peripheral bus. Preferably, the peripheral bus is connected to a peripheral device through a bus controller, and the gain or loss of the peripheral bus results from insertion or removal of the peripheral bus from the computer system.

As a method for dynamically adding a peripheral bus of a peripheral device to a computer system when the peripheral device is connected to the computer system, an embodiment of the invention includes the operations of: determining that a peripheral device has recently been connected to a computer system which executes an operating system; identifying a controller manipulator for a peripheral bus associated with the peripheral device determined to be recently connected to the computer system; loading the identified controller manipulator into system memory of the computer system; and notifying the operating system that the peripheral bus is available for use by the computer system. Additionally, the method may further operate to dynamically remove a peripheral bus of a peripheral device from the computer system.

As a computer system, an embodiment of the invention includes a CPU; a system bus coupled to the CPU; a memory controller coupled to the system bus; a RAM coupled to the memory controller; at least one slot capable of receiving a peripheral bus coupled to a peripheral device; a slot manager for managing operations of the slot, the operations of the slot being managed include detection of insertion or removal of a peripheral device from the slot; and an operating system including a peripheral bus manager, the peripheral bus manager operates to dynamically add or remove a peripheral bus associated with the peripheral device from the computer system while the computer system is operating based on whether the slot manager detects insertion or removal of the peripheral bus.

As a computer readable medium containing program instructions for dynamically adding a peripheral bus of a peripheral device to a computer system when the peripheral device is connected to the computer system, an embodiment of the invention includes: computer readable code devices for determining that a peripheral device has recently been connected to a computer system which executes an operating system; computer readable code devices for identifying a controller manipulator for a peripheral bus associated with the peripheral device determined to be recently connected to the computer system; computer readable code devices for loading the identified controller manipulator into system memory of the computer system; and computer readable code devices for notifying the operating system that the peripheral bus is available for use by the computer system.

The advantages of the invention are numerous. One advantage of the invention is that an operating system is isolated from bus controller manipulators. As a result, the operating system no longer must be revised to make use of newly developed bus controller manipulators. Third party developers are also no longer dependent on the producers of operating systems to implement their specific bus controller manipulators. Another advantage of the invention is that the utilization of system resources is better managed so that such resources are used only when actually needed. Yet another advantage of the invention is that the invention is capable of working with various different operating systems.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–5B. However, those skilled in the art will readily appreciate that the detailed description given herein with respect to these figures is for explanatory purposes as the invention extends beyond these limited embodiments.

The invention pertains to dynamic addition or removal of buses to a computer system while the computer system and its operating system are in use. As buses are added or removed from the operational computer system for each peripheral device added or removed, bus controller manipulators for each of the buses are registered with a system bus manager of the operating system. Thereafter, the operating system is able to communicate with the peripheral devices over the corresponding buses using the respective bus controller manipulators. With the present invention, a bus and its resources are allocated only when the bus is actually present physically for use by the computer system.

Figure 1:
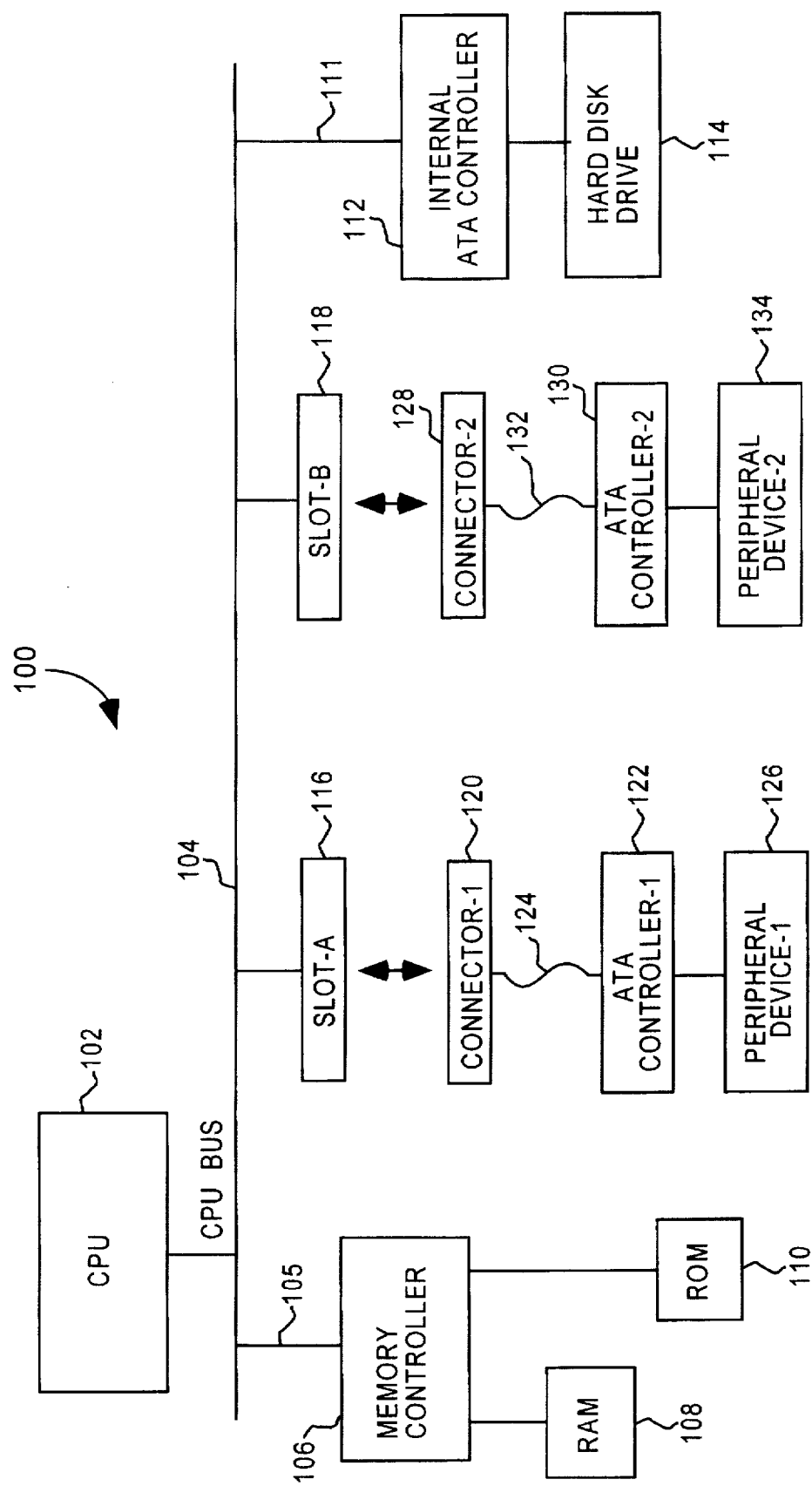
FIG. 1 is a block diagram of a portion of a computer system according to the invention.

FIG. 1 is a block diagram of a portion of a computer system 100 according to the invention. The portion of the computer system 100 illustrated in FIG. 1 pertains to a system bus and its utilization by internal and external devices.

The computer system 100 includes a central processing unit (CPU) 102 and a CPU bus 104 coupled to the CPU 102. The CPU bus 104 serves as a system bus that provides a primary path for communication with the CPU 102. In particular, the CPU bus 104 couples to various other buses that support peripheral functions of the computer system 100.

A memory bus 105 couples a memory controller 106 to the CPU bus 104. The memory controller 106 operates to control the transfer of data to and from a random access memory (RAM) 108 and from a read-only memory (ROM) 110. The data transfer with the RAM 108 and ROM 110 is achieved over the memory bus 105 and the CPU bus 104.

A disk drive bus 111 couples an internal ATA controller 112 to the CPU bus 104. The internal ATA controller 112 is coupled to a hard disk drive 114. Hence, the transfer of data to and from the hard disk drive 114 and the CPU 102 is performed over the CPU bus 104 and the disk drive bus 111.

The computer system 100 also includes a first slot (SLOT-A) 116 and a second slot (SLOT-B) 118. These slots 116 and 118 are slots of the computer system 100 that are capable of receiving a board, connector or card so as to connect a peripheral device and its associated bus to the CPU bus 104 of the computer system 100. Specifically, a first connector (CONNECTOR-1) 120 can be inserted or removed from the first slot (SLOT-A) 116. The first connector 120 is coupled to a first ATA controller (ATA CONTROLLER-1) 122 by way of a first ATA bus (ATA BUS-1) 124. The connection to the first ATA bus 124 is, for example, a flexible ribbon cable. The first ATA controller 122 couples to and operates to control data transfer for a first peripheral device (PERIPHERAL DEVICE-1) 126.

A second connector (CONNECTOR-2) 128 can be physically inserted or removed from the second slot 118. The second connector 128 couples to a second ATA controller (ATA CONTROLLER-2) 130 by way of a second ATA bus (ATA BUS-2) 132. The second ATA controller (ATA CONTROLLER-2) 130 couples to and operates to control data transfer for a second peripheral device (PERIPHERAL DEVICE-2) 134.

The peripheral devices can be internal or external devices. For example, in FIG. 1, the RAM 108, the ROM 110 and hard disk drive 114 can be considered as internal peripheral devices, whereas the first and second peripheral devices 126 and 134 can be considered external peripheral devices. Typically, the internal peripheral devices are more less directly coupled to the CPU bus 104, while the external peripheral devices are coupled to the CPU bus 104 by way of a slot or connector. Although the external peripheral devices (peripheral devices 126 and 134) of the computer system 100 illustrated in FIG. 1 concentrate on ATA devices, buses and controllers, the devices, buses and controllers need not be ATA designs. Various alternative types of designs could likewise be used. For example, the designs of the devices could have SCSI, PCI, IDE or IEEE-1394 (firewire) designs. Although for a given peripheral device its associated controller and bus are all of the same type, the computer system 100 will normally support various types of peripheral devices at both the internal and external level.

The general operation of the computer system 100 according to the invention is as follows. The RAM 108, the ROM 110 and the hard disk drive are internal peripheral devices which are not normally inserted or removed from the computer system 100 while it is in operation, though according to the invention they could be. The first and second peripheral devices 126 and 134 are coupled to the computer system 100 through the respective connectors 120 and 128 and thus are designed to be removed or inserted at a user's will. The particular type and size of the connectors used on the computer system 100 are a matter of design choice. Given that the large variety of peripheral devices that can be connected to the computer system 100 through the connectors 120 and 128, to provide operability and flexibility, the computer system 100 according to the invention allows the peripheral device or its controller to identify (or even provide) communication control information that is to be followed when communicating with the peripheral device. This is a substantial advantage because the operating system no longer needs to provide this information in what was previously only possible in a restrictive, limited way. The operating system is then able to use communication control information from many different sources and is no longer reliant on the operating system having the updated communication control information. In addition, peripheral buses are established and eliminated as needed by the peripheral devices so as to better utilize system resources.

Figure 2:
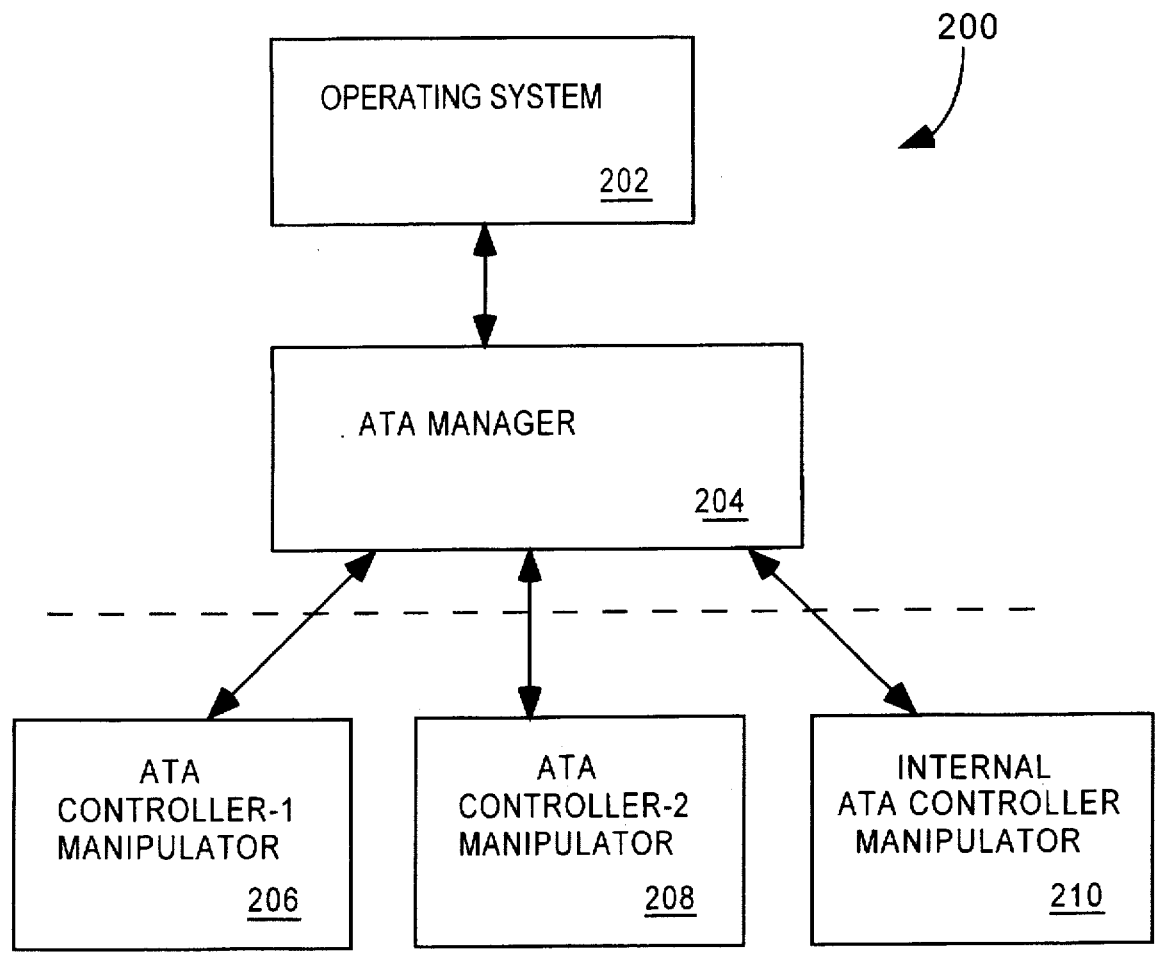
FIG. 2 is a block diagram of an operating system structure according to an embodiment of the invention.

According to the invention, to provide flexibility and isolate the operating system from the hardware details of peripheral devices, an operating system for the computer system is preferably provided with an improved structure or organization such as depicted in FIG. 2. FIG. 2 is a block diagram of an operating system structure 200 according to an embodiment of the invention. The operating system structure 200 includes an operating system 202 having a file system and device drivers as well known in the art. The operating system structure 200 also includes an ATA manager 204 that manages various ATA controller manipulators 206–210. The ATA controller manipulators are the files or data structures that provides the communication control information for utilization of the peripheral buses. The ATA manager 204 manages the dynamic addition and removal of the ATA controller manipulators 206–210 in accordance with the connection of peripheral buses to the system bus 104. In particular, the operating system structure 200 includes a first ATA controller manipulator (ATA CONTROLLER-1 MANIPULATOR) 206, a second ATA controller manipulator (ATA CONTROLLER-2 MANIPULATOR) 208, and an internal ATA controller manipulator 210. With respect to FIG. 1, the first ATA controller manipulator 206 interacts with the first ATA controller 122, the second ATA controller manipulator 208 interacts with the second ATA controller 130, and the internal ATA controller manipulator 210 interacts with the internal ATA controller 112. However, the ATA controller manipulators 206, 208 and 210 are only present if the corresponding ATA buses are coupled to the computer system 100.

The ATA controller manipulators 206, 208 and 210 are respectively provided for the types of devices being coupled to the ATA buses. The ATA controller manipulators 206–210 preferably provide the communication control information that enables the operating system 202 (through the ATA manager 204) to communicate with the peripheral devices. The functional operations facilitated by these ATA controller manipulators 206, 208 and 210 include initialization, interrupt handling, closing, bus event handling, and actions (e.g., data transfer). In general, however, the ATA controller manipulators 206–210 are bus controller manipulators that are designed for particular types of peripheral devices such as ATA, SCSI, IDE, etc.

The ATA manager 204 and the ATA controller manipulators 206, 208 and 210 preferably interact through a set of function calls. The function calls to the controller manipulators include: an initialization function, a close function, an action function, a handle bus event function, and an interrupt handler function. The function calls to the ATA manager 204 include: a I/O done function and a bus event request function. The typical scenario of interaction is as follows. The ATA manager 204 requests that the controller manipulator perform the initialization function to initialize itself. The initialization includes the setting up of interrupt handlers to receive interrupts for the associated peripheral device. Then, the ATA manager 204 requests some action by the controller manipulator by the action function. For example, an application might request data from a file system that in turn requests the data from the ATA manager who communicates the request to the controller manipulator. When the interrupt handler of the controller manipulator receives an interrupt for the associated peripheral device, the ATA manager 204 is notified that an interrupt has occurred. The ATA manager 204 then calls the handle bus event function to enable the controller manipulator to handle the processing of the event. The action function receives the requests from the ATA manager 204 and queues them internally and dispatches them as the associated peripheral bus becomes available. Once the request is completed, the controller manipulator calls back to the ATA manager 204 using the I/O done function to signal that the event has been processed. Thereafter, the ATA manager 204 posts the results. Whenever the peripheral device associated with the controller manipulator is removed from the computer system, the ATA manager 204 requests the controller manipulator to perform the close function to remove the data structure associated with itself and its interrupt handlers.

The request is communicated between the ATA manager 204 and the controller manipulator using a parameter block. The parameter block is a predefined data structure having fields for information being communicated between the ATA manager 204 and the controller manipulator.

Figure 3A:
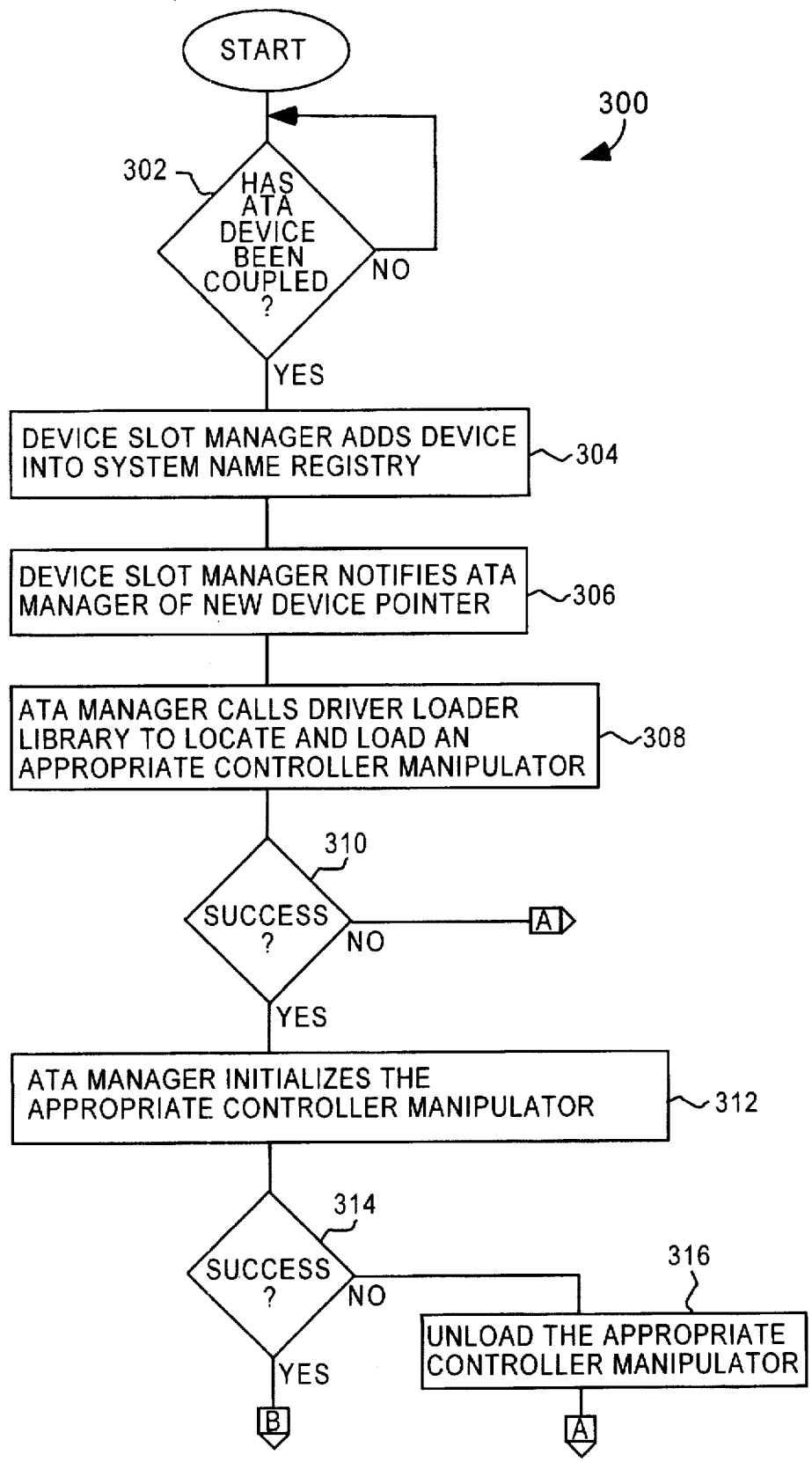
FIGS. 3A and 3B are flow diagrams of dynamic addition processing according to an embodiment of the invention.
Figure 3B:
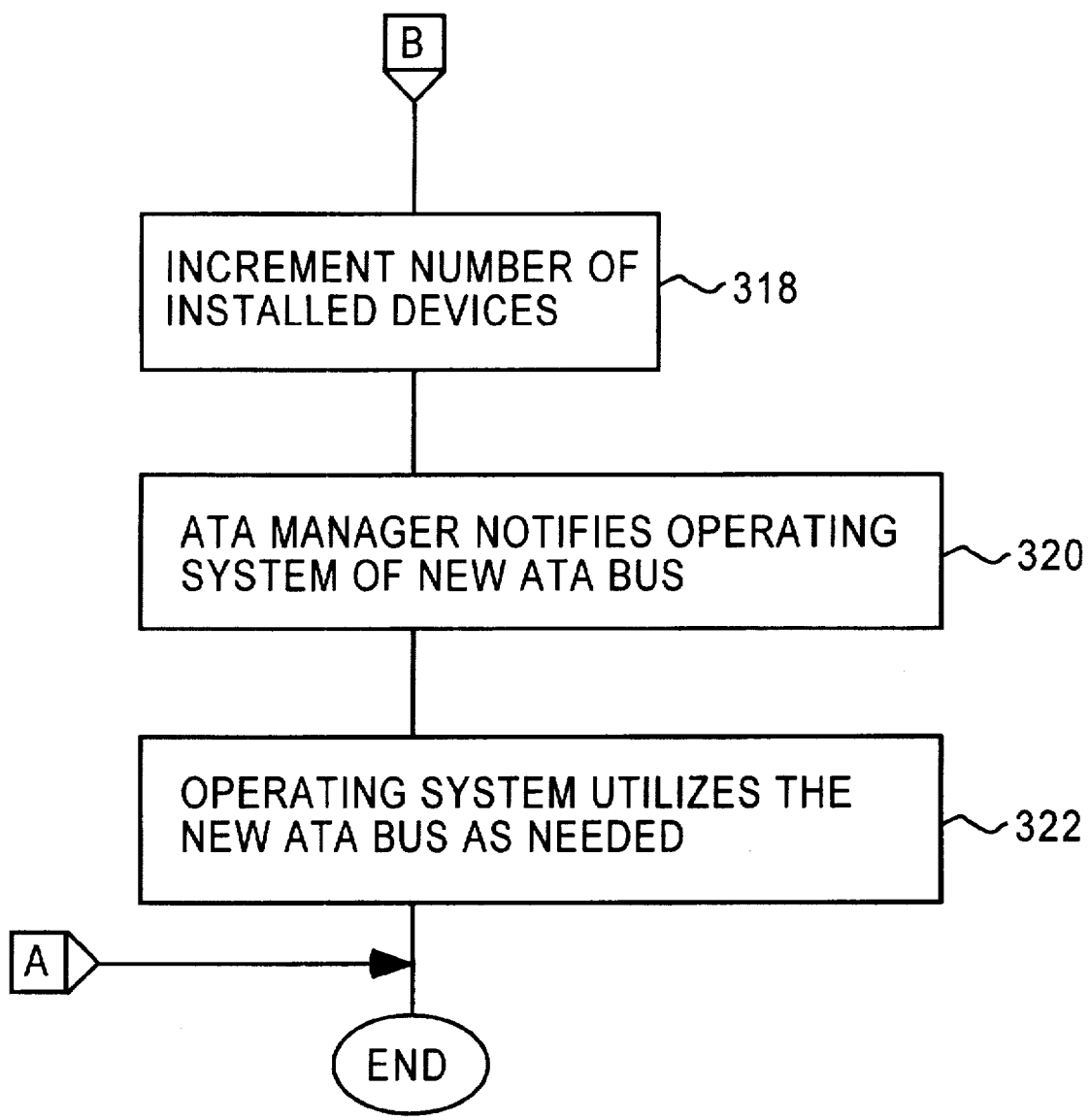

FIGS. 3A and 3B are flow diagrams of dynamic addition processing 300 according to an embodiment of the invention. The dynamic addition processing 300 operates to dynamically recognize and facilitate the use of a bus (e.g., peripheral bus) on a computer system, such as the computer system 100, while the computer system is in operation. In this embodiment of the dynamic addition processing 300, the peripherals and buses are preferably ATA devices. However, it should be understood that the peripherals and bus may be designed for other types of buses. The operation of the dynamic addition processing 300 is described below with reference to the computer system that performs the dynamic addition processing 300.

The dynamic addition processing 300 begins with a decision block 302 that determines whether an ATA device has been coupled to the computer system. Typically, an ATA device becomes coupled to the computer system by being inserted into an open slot of the computer system. As an example, a user might insert a CD-ROM drive into a slot or peripheral port of a computer system. In general, however, an ATA device couples to the computer system by connecting to the CPU bus 104. Until an ATA device becomes coupled to the computer system, the dynamic addition processing 300 awaits the insertion of an ATA device (i.e., polling method). Once an ATA device has been coupled to the computer system, the dynamic addition processing 300 continues. In an alternative embodiment of the dynamic addition processing 300, the decision block 302 could be eliminated with the dynamic addition processing then being activated when the computer system determines that an ATA device has been coupled (i.e., interrupt driven method). The interrupt driven method is the preferred technique to initiate the dynamic addition processing 300.

Next, a device slot manager adds 304 device information into a system name registry. The device slot manager is part of the operating system and operates to manage operations of the associated slot of the computer system. Preferably, once a peripheral device is physically inserted into a slot an interrupt is triggered, which in turn signals the device slot manager to (among other things) add device information for the peripheral device into the system name registry that resides on the computer system. The system name registry is a data structure containing the names of the active devices of the computer system. The system name registry is, for example, provided by existing software available for UNIX, Windows and Apple based computer platforms. The system name registry is also referred to as a device tree on some systems. A representative system name registry is illustrated below. The device slot manager then notifies 306 the ATA manager of a device pointer for the new device that has been added to the system name registry.

Next, the ATA manager calls 308 a driver loader library to locate and load an appropriate controller manipulator into system memory (e.g., RAM). For example, in the computer system 100, the system memory is the RAM 108. The driver loader library is another operating system utility that is well known in the art and used to locate and load files. Here, the ATA manager attains the name of the appropriate controller manipulator from the pointer received from the device slot manager. The ATA manager is then able to locate and load the appropriate controller manipulator using the driver loader library.

Thereafter, a decision block 310 determines whether the appropriate controller manipulator has been both located and loaded successfully. If the appropriate controller manipulator has not been located or if located does not load properly, the dynamic addition processing 300 ends. On the other hand, when the driver loader library is able to locate and load the appropriate controller manipulator, the dynamic addition processing 300 continues. In particular, the ATA manager initializes 312 the appropriate controller manipulator. By initializing the appropriate controller manipulator, interrupt handlers are set up for the controller manipulator being installed, and system resources are allocated for control of a bus. The initializing may also probe for the presence of peripheral devices.

Then, a decision block 314 determines whether the ATA manager successfully initialized the appropriate controller manipulator. If the appropriate controller manipulator does not initialize successfully, the appropriate controller manipulator is unloaded and the dynamic addition processing 300 ends. On the other hand, when the appropriate controller manipulator initializes successfully, the dynamic addition processing 300 continues. In particular, the number of installed devices is incremented 318. Hence, the number of installed devices is updated to reflect the fact that a new device and its associated ATA bus have been added to the computer system. The ATA manager then notifies 320 the operating system of the new ATA bus. Thereafter, the operating system is able to utilize 322 the new ATA bus as needed. Following block 322, the dynamic addition processing 300 is complete and ends.

Figure 4:
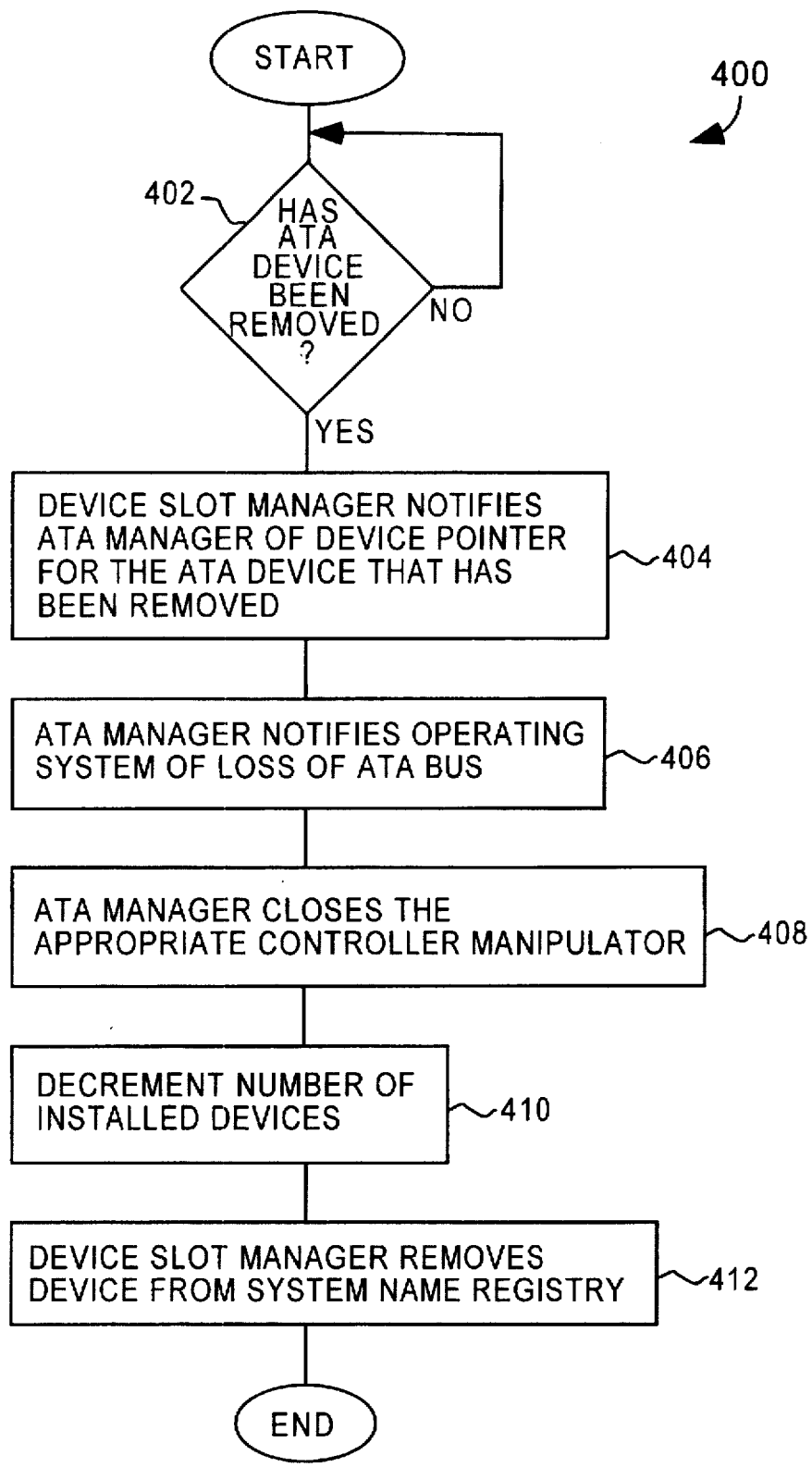
FIG. 4 is a flow diagram of dynamic removal processing according to an embodiment of the invention.

FIG. 4 is a flow diagram of dynamic removal processing 400 according to an embodiment of the invention. As an example, the dynamic removal processing 400 can be performed by the operating system 200 and the ATA manager 204 operating on the computer system 100. In addition, the operating system 200 includes device slot managers for each of the slots (e.g., slots 116 and 118) of the computer system 100.

The dynamic removal processing 400 begins with a decision block 402 that determines whether an ATA device has been decoupled from the computer system. The decoupling is from the CPU bus 104 of the computer system. Typically, the decoupling involves the removal of an ATA device from a slot on the computer system. If the removal of an ATA device has not been detected, the decision block 402 causes the dynamic removal processing 400 to await the removal of an ATA device (i.e., polling method). Alternatively, the dynamic removal processing 400 could eliminate the decision block 402 and instead directly activate the dynamic removal processing after the detection of the removal of an ATA device occurs by the computer system 100 (i.e., interrupt driven method). The interrupt driven method is the preferred technique to initiate the dynamic removal processing 400.

In any case, following the decision block 402 when an ATA device has been removed (decoupled) from a slot of the computer system, the dynamic removal processing 400 continues. A device slot manager for the slot from which the ATA device has been removed, notifies 404 the ATA manager of a device pointer for the ATA device that has been removed. The device pointer is a pointer that points to the location of the identifying information for the ATA device in the system name registry. Next, the ATA manager notifies 406 the operating system of a loss of the ATA bus that was associated with the ATA device that has been removed. Once the ATA manager is so notified, the ATA manager no longer permits utilization of the ATA bus. Then, the ATA manager closes the appropriate controller manipulator associated with the ATA bus that has been removed 408. The appropriate controller manipulator associated with the ATA bus that has been removed is also removed from the system memory at this time. The number of installed devices is also decremented 410 to reflect the fact that the ATA device has been removed from the computer system. Finally, the device slot manager removes 412 the device from the system name registry. Following block 412, the dynamic removal processing 400 is complete and ends.

Figure 5A:
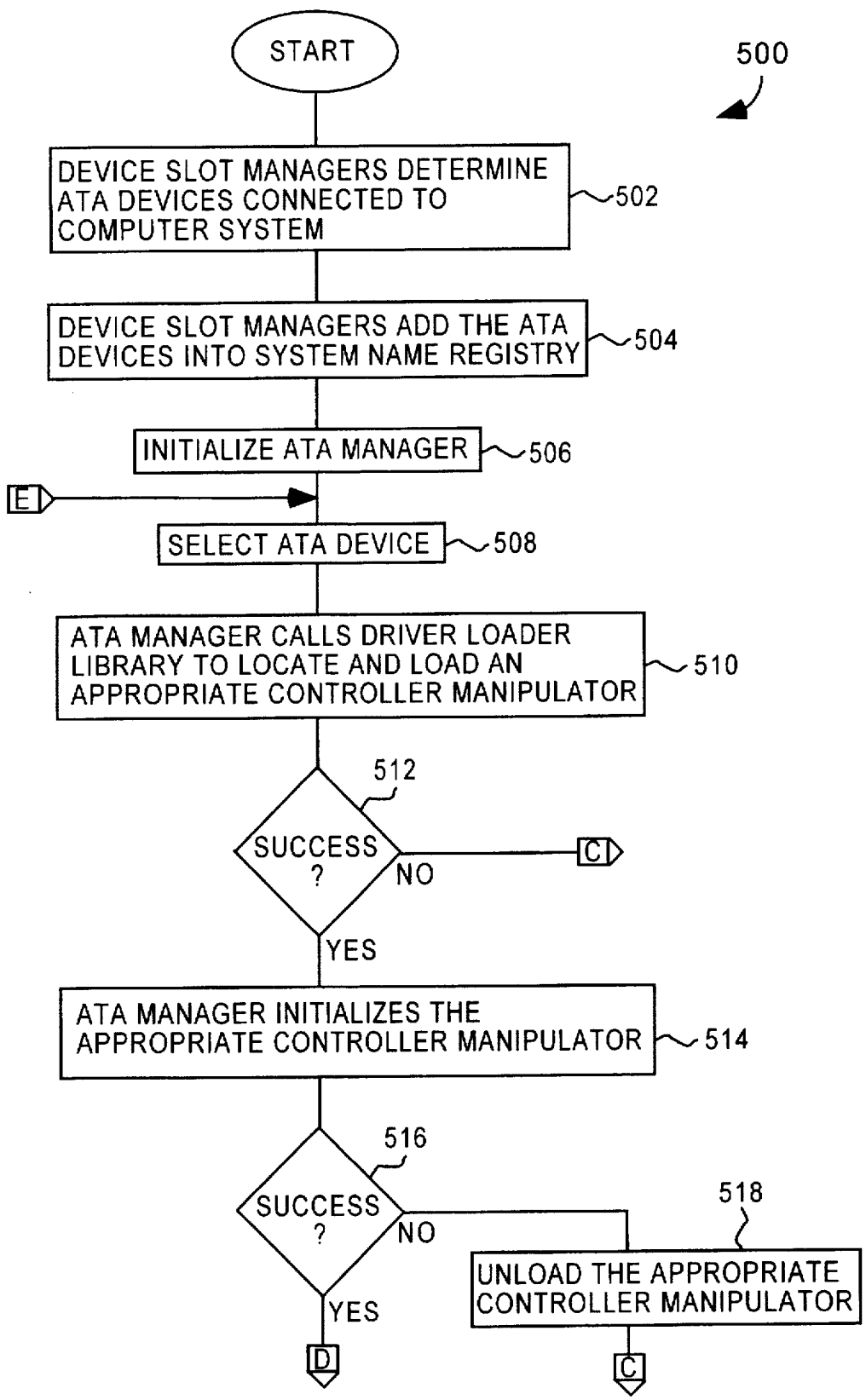
FIGS. 5A and 5B are flow diagrams of initialization processing according to an embodiment of the invention.
Figure 5B:
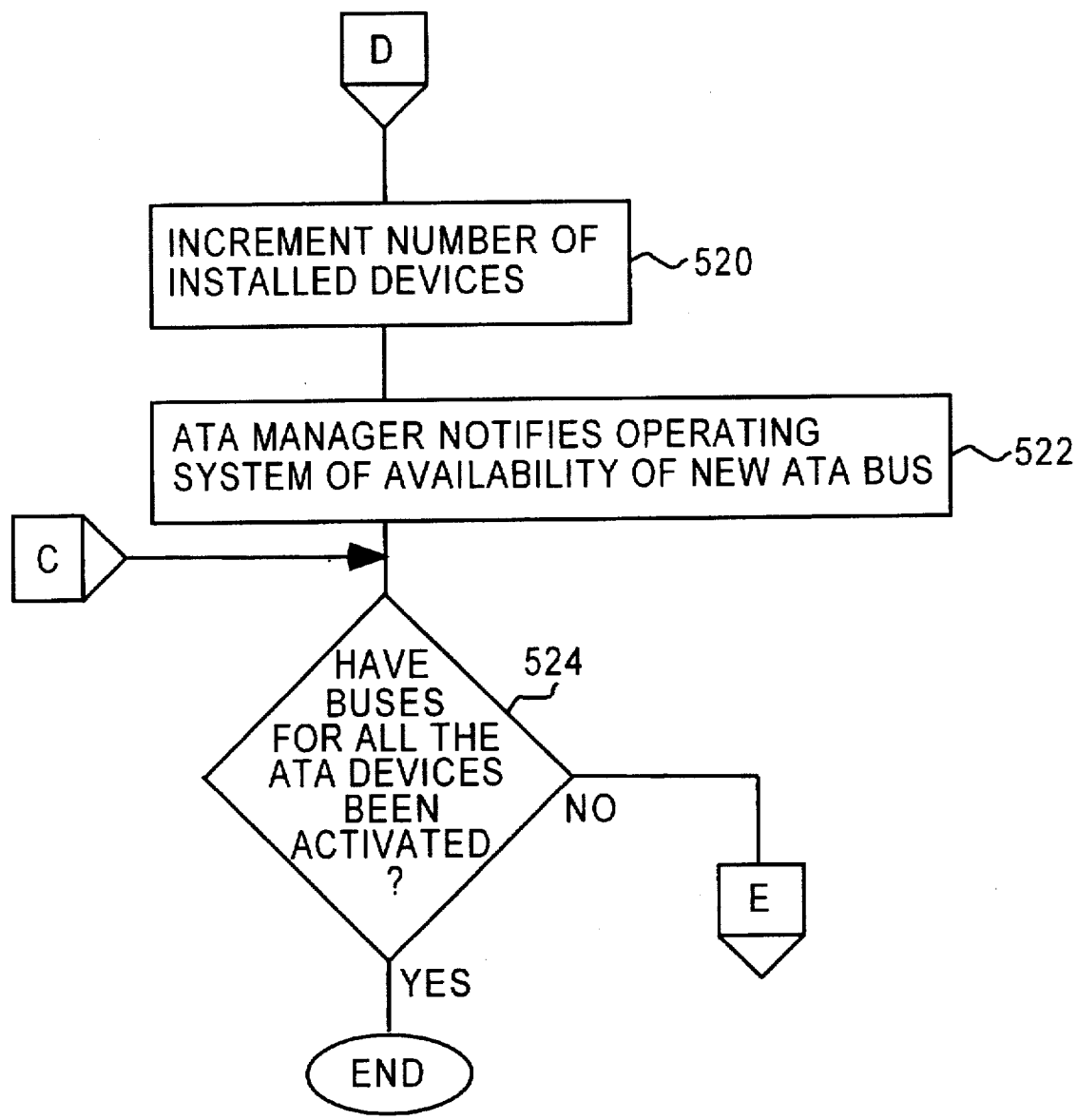

FIGS. 5A and 5B are flow diagrams of initialization processing 500 according to an embodiment of the invention. The initialization processing 500 is preferably implemented by device slot managers and the ATA manager of the operating system structure 200 as detailed below. The initialization processing 500 is activated upon power-up or reboot of a computer system.

The initialization processing 500 begins by determining 502 the ATA devices that are connected to the computer system. The determination of the ATA devices that are connected to the computer system is preferably performed by the device slot managers for the respective slots or peripheral buses in the computer system. Next, the device slot managers add 504 the ATA devices that have been determined to be connected to the computer system into the system name registry. Here, the device slot managers individually insert into the system name registry information pertaining each of the ATA devices that have been determined to be connected to the computer system. Hence, the blocks 502 and 504 operate to fill the system name registry with the ATA buses of the computer system upon initialization of the computer system.

Next, the ATA manager is initialized 506. Thereafter, the ATA manager operates to selectively configure and initialize the ATA buses (including the controller manipulators) for each of the ATA devices that have been determined to be connected to the computer system. The configuring of the computer system and the operating system for each of the ATA buses is explained as follows.

Initially, one of the ATA devices that has been determined to be connected to the computer system is selected 508. Then, the ATA manager calls 510 the driver loader library to locate and load an appropriate controller manipulator for the selected ATA device. A decision block 512 then determines whether the driver loader library has successfully located and loaded the appropriate controller manipulator. If the driver loader library was unable to locate or load the appropriate controller manipulator, the processing by the ATA manager for the selected ATA device is completed without activating a bus for the selected ATA device because the appropriate controller manipulator could not be either located or loaded.

On the other hand, if the decision block 512 determines that the driver loader library was able to successfully locate and load the appropriate controller manipulator, the ATA manager continues to process the selected ATA device. In this regard, the ATA manager then initializes 514 the appropriate controller manipulator. Preferably, the initialization of the appropriate controller manipulator is a defined function of the controller manipulator and is activated by a call from the ATA manager to the appropriate controller manipulator. A decision block 516 then determines whether the initialization of the appropriate controller manipulator was successful. If the initialization of the appropriate controller manipulator was unsuccessful, the appropriate controller manipulator is unloaded 518 from the system memory and the processing by the ATA manager for the selected ATA device is completed without activating a bus for the selected ATA device because the appropriate controller failed to initialize itself properly.

Alternatively, when the appropriate controller manipulator is successfully initialized, the decision block 516 causes the initialization processing 500 to continue. In particular, the number of installed devices is incremented 520 to reflect the fact that the selected ATA device and its associated ATA bus have been activated. Next, the ATA manager notifies the operating system of the availability of the new ATA bus 522. Following block 522, as well as following block 518 and following the decision block 512 after an unsuccessful load attempt, a decision block 524 determines whether buses for all of the ATA devices have been activated (or at least attempted to be activated). If the decision block 524 indicates that all of the ATA devices that have been determined to be connected to the computer system have not yet had buses activated, the initialization processing 500 returns to repeat block 508 and subsequent blocks to process another one of the selected ATA devices. On the other hand, when the decision block 524 indicates that buses for all of the ATA devices have been activated (or at least attempted to be activated), the initialization processing 500 is complete and ends.

The ATA controller manipulators, can reside in a variety of different locations within the computer system. For example, the ATA controller manipulators for the various peripheral devices can reside or form part of the operating system, or can reside on a controller card, or may reside on a system disk (e.g., hard disk drive). A function of the driver loader library (which is conventional and known by those skilled in the art, is to use information stored in the system name registry to locate (find) the controller manipulator in the computer system wherever it may reside.

Examples of peripheral devices using ATA controllers include a hard disk drive, a CD-ROM drive, a PC card, etc.

The system name registry in effect builds a tree that uses the various devices within the computer system as nodes. An example of an entry in the system name registry is as follows.

Devices: device_tree: CPUbus: slot_1 : ATA

In this representative example, there is an ATA device in a first slot of the computer system coupled to the CPU bus. If this ATA device is later removed from the first slot, this entry in the system name registry will be deleted from the system name registry.

Hence, the ATA buses being dynamically added or removed from the computer system show up as a node in the system name registry when they are coupled to and available for use by the computer system. The principle information provided with the node in the system name registry is the name of the appropriate controller manipulator for the ATA bus. The name of the appropriate controller manipulator is used by the driver loader library to locate and load the appropriate controller manipulator. Additional information may also be provided in the node to further assist the computer system 100 in utilizing the peripheral device in its associated ATA bus. The additional information, for example, may include the address of the ATA controller, a bus identifier, an interrupt locator, a device name, and a pointer to the controller manipulator). The device name is the name of the controller manipulator for the particular ATA bus associated with the node. The pointer is used to point to the location of the controller manipulator in memory. The pointer is used by the ATA manager or the controller manipulator. The controller manipulator operates much like a driver so that software need not be concerned with the specifics of the hardware.

The ATA controller manipulators are data structures that are stored in the system memory when the peripheral devices are installed. These controller manipulators are also referred to as ATA Interface Modules (AIMs) because they interface the operating system to the peripheral controller for the peripheral device. By using the controller manipulators to contain hardware dependent information, the operating system becomes hardware independent with respect to bus communications.

By providing the dynamic addition and removal of buses for the computer system, the computer system does not need to be restarted or rebooted to take advantage of the newly added buses to the computer system. As the buses become available to the computer system, they are registered with the ATA manager and initialized so as to become usable by the computer system.

Although the invention is particularly useful for computer systems that permit hot-plugging of peripheral devices, the invention is also suitable for use in computer system that do not offer hot-plugging. Nevertheless, with respect to hot-plugging, upon hot-plugging a peripheral device into a slot of a computer system, a device slot manager for the slot, determines the type of device inserted and signals the ATA manager 204 of the new device. The ATA manager then installs the appropriate controller manipulator for the device, sets a bus ID for the peripheral bus of the device, and call the initialization function. Then drivers are loaded for the devices on the peripheral bus. Alternatively, when removing an active peripheral from a slot of the computer system, the physical removal of the device notifies the device slot manager for the slot, and informs the ATA manager 204 to remove the controller manipulator for the device using the bus ID. The ATA manager then closes the controller manipulator identified by the bus ID.

The advantages of the invention are numerous. One advantage of the invention is that system resources (i.e., RAM) is better allocated and deallocated by the invention. Another advantage of the invention is that the operating system has a flexible design in which ATA controller manipulators are separate blocks of computer code and are not included within the operating system. As a result, the operating system is independent of the ATA controller manipulators and thus as peripheral manufacturers are able to update or alter the protocol used to interact with their peripheral ATA devices and associated ATA controllers. In other words, changes or modifications to ATA controller manipulators are easily made without requiring the operating system of the computer system to be changed or updated; instead, only the particularized blocks of computer code (namely the ATA controller manipulators) need be updated or replaced in the computer system.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for dynamically managing buses of a computer system having an operating system, said method comprising:
   (a) monitoring gain or loss of a peripheral bus to the computer system during operation of the computer system;
   (b) allocating system resources when the peripheral bus is gained by the computer system;
   (c) deallocating system resources when the peripheral bus is lost by the computer system;
   (d) informing the operating system of the gain or loss of the peripheral bus; and
   (e) maintaining a number of active peripheral buses for the computer system by incrementing a number of active peripheral buses when a peripheral bus is gained by the computer system, and by decrementing the number of active peripheral buses when a peripheral bus is lost by the computer system.

2. A method as recited in claim 1, wherein the peripheral bus is connected to and associated with a peripheral device.

3. A method as recited in claim 2, wherein the peripheral bus is connected to the peripheral device through a bus controller.

4. A method as recited in claim 3, wherein the peripheral device is an ATA device, the peripheral bus is an ATA bus, and the bus controller is an ATA controller.

5. A method as recited in claim 1, wherein the peripheral bus is connected to a peripheral device, and wherein the gain or loss of the peripheral bus results from insertion or removal of the peripheral bus from the computer system.

6. A method as recited in claim 1, wherein, when the peripheral bus is gained by the computer system, said method further comprises:
   (e) loading into the allocated system resources a controller manipulator associated with the peripheral bus being gained by the computer system.

7. A method as recited in claim 6, wherein the controller manipulator is utilized by the operating system when accessing the peripheral device.

8. A method as recited in claim 6, wherein, when the peripheral bus is lost by the computer system, said method further comprises:
   (f) unloading the controller manipulator previously loaded into the allocated system resources for the peripheral bus being lost by the computer system.

9. A method as recited in claim 6, wherein the controller manipulator is a data structure supporting a plurality of function calls, the data structure being dependent on hardware associated with the peripheral bus.

10. A method for dynamically adding a peripheral bus of a peripheral device to a computer system when the peripheral device is connected to the computer system, said method comprising the operations of:
    (a) determining that a peripheral device has just been connected to a computer system which executes an operating system;
    (b) identifying a controller manipulator for a peripheral bus associated with the peripheral device determined to be just connected to the computer system, said identifying (b) includes the operations of (b1) adding peripheral bus information to a system name registry for the peripheral bus associated with the peripheral device determined to be just connected to the computer system; and (b2) using the peripheral bus information from the system name registry to locate the controller manipulator for the peripheral bus associated with the peripheral device determined to be just connected to the computer system;
    (c) loading the identified controller manipulator into system memory of the computer system; and
    (d) notifying the operating system that the peripheral bus is available for use by the computer system.

11. A method as recited in claim 10, wherein the peripheral device is an ATA device, the peripheral bus is an ATA bus, and the controller manipulator is an ATA controller manipulator.

12. A method as recited in claim 10, wherein said method further comprises:
    (e) incrementing a number of installed devices.

13. A method as recited in claim 10, wherein the controller manipulator is a data structure supporting a plurality of function calls, the data structure being dependent on hardware associated with the peripheral bus.

14. A method as recited in claim 10, wherein said method further operates to dynamically remove a peripheral bus of a peripheral device from the computer system, and wherein said method further comprises:
    (e) thereafter monitoring the peripheral device to determine whether the peripheral device is disconnected from the computer system;

(f) notifying the operating system that the peripheral bus is no longer available for use by the computer system when said monitoring (e) determines that the peripheral device has been disconnected from the computer system; and (g) unloading, from the system memory, the controller manipulator associated with the peripheral device that has been disconnected from the computer system.

15. A method as recited in claim 14, wherein the peripheral device is an ATA device, the peripheral bus is an ATA bus, and the controller manipulator is an ATA controller manipulator.

16. A method as recited in claim 14, wherein said method further comprises:

(h) decrementing a number of installed devices.

17. A method as recited in claim 14, wherein the controller manipulator is a data structure supporting a plurality of function calls, the data structure being dependent on hardware associated with the peripheral bus.

18. A computer system, comprising:

a CPU;

a system bus coupled to said CPU;

a memory controller coupled to said system bus;

a RAM coupled to said memory controller;

at least one slot capable of receiving a peripheral bus coupled to a peripheral device;

a slot manager for managing operations of said slot, the operations of said slot being managed include detection of inseration or removal of a peripheral device from said slot; and an operating system including a peripheral bus manager, the peripheral bus manager operates to dynamically add or remove a peripheral bus associated with the peripheral device to or from said computer system while said computer system is operating based on whether said slot manager detects insertion or removal of the peripheral device, wherein said peripheral bus manager maintains a count of the peripheral devices that are active within said computer system by incrementing the count when a peripheral bus is added and by decrementing the count when a peripheral bus is removed.

19. A computer system as recited in claim 18, wherein said operating system comprises:

a controller manipulator associated with the peripheral bus, said controller manipulator containing communication information for the peripheral device; and a bus manager for managing communications between said CPU and the peripheral device via said system bus and the peripheral bus, said bus manager uses the communications information in managing such communications.

20. A computer system as recited in claims 19, wherein said computer system supports a plurality of peripheral devices, and for each of the peripheral devices that are coupled to the computer system a controller manipulator is installed therefore, and for each of the installed peripheral devices that are subsequently removed from the computer system one of the controller manipulators is uninstalled.

21. A computer readable medium containing program instructions for dynamically adding a peripheral bus of a peripheral device to a computer system when the peripheral device is connected to the computer system, said computer readable medium comprising:

computer program code for determining that a peripheral device has just been connected to a computer system, the computer system executes an operating system;

computer program code for identifying a controller manipulator for a peripheral bus associated with the peripheral device determined to be just connected to the computer system, said computer program code for identifying the controller manipulator includes program code for adding peripheral bus information to a system name registry for the peripheral bus associated with the peripheral device determined to be just connected to the computer system; and program code for using the peripheral bus information from the system name registry to locate the controller manipulator for the peripheral bus associated with the peripheral device determined to be just connected to the computer system;

computer program code for loading the identified controller manipulator into system memory of the computer system; and computer program code for notifying the operating system that the peripheral bus is available for use by the computer system.

22. A computer readable medium as recited in claim 21, wherein said computer readable medium further includes program instructions for dynamically removing a peripheral bus of a peripheral device from the computer system, and wherein said computer readable medium further comprises:

computer program code for monitoring the peripheral device to determine whether the peripheral device is disconnected from the computer system;

computer program code for notifying the operating system that the peripheral bus is no longer available for use by the computer system when the monitoring determines that the peripheral device has been disconnected from the computer system; and computer program code for unloading, from the system memory, the controller manipulator associated with the peripheral device that is determined to disconnected from the computer system.

\* \* \* \* \*